(12) United States Patent
Lang

(10) Patent No.: US 11,298,786 B2
(45) Date of Patent: Apr. 12, 2022

(54) CLAMPING MEANS SYSTEM CAPABLE OF AUTOMATION

(71) Applicant: LANG TECHNIK GMBH, Holzmaden (DE)

(72) Inventor: Philipp Lang, Wernau (DE)

(73) Assignee: LANG TECHNIK GMBH, Holzmanden (DE)

( * ) Notice: Subject to any disclaimer, the term of this patent is extended or adjusted under 35 U.S.C. 154(b) by 334 days.

(21) Appl. No.: 15/700,316

(22) Filed: Sep. 11, 2017

(65) Prior Publication Data

US 2017/0368651 A1 Dec. 28, 2017

Related U.S. Application Data

(63) Continuation-in-part of application No. PCT/EP2016/054637, filed on Mar. 4, 2016.

(30) Foreign Application Priority Data

Mar. 12, 2015 (DE) ..................... 10 2015 103 653.3

(51) Int. Cl.
*B23Q 1/00* (2006.01)
*B23Q 7/10* (2006.01)
(Continued)

(52) U.S. Cl.
CPC ............. *B23Q 1/0072* (2013.01); *B23Q 7/10* (2013.01); *B23Q 7/1494* (2013.01); *B25B 1/103* (2013.01);
(Continued)

(58) Field of Classification Search
CPC ........ B23Q 7/10; B23Q 7/1494; B23Q 7/046; B23Q 7/1426; B23Q 7/1442;
(Continued)

(56) References Cited

U.S. PATENT DOCUMENTS 4,698,475 A 10/1987 Lothenbach et al.
8,011,648 B1 9/2011 Nelson
(Continued)

FOREIGN PATENT DOCUMENTS

DE 41 16 104 C1 12/1992
DE 4116104-01 * 12/1992 ........... B23H 11/003
(Continued)

OTHER PUBLICATIONS

International Search Report (in English) for corresponding international application PCT/EP2016/054637 dated May 19, 2016 (3 pages).
(Continued)

*Primary Examiner* — Tyrone V Hall, Jr.
*Assistant Examiner* — Aaron R McConnell
(74) *Attorney, Agent, or Firm* — Ronald S. Lombard

(57) ABSTRACT

A clamping means system including a bearing device and clamping vices, which fit into the bearing device and respectively have on their base area machine coupling system and on their side faces and flanks a bearing receiving contour and a gripping receiving contour. The bearing receiving contour has the greatest play; the fit between the gripper and the gripper receiving contour is of moderate precision, while the precision of the machine coupling system is the greatest. The clear functional separation between the machine coupling system and the bearing receiving contour or gripper receiving contour allows a reliable low-cost system to be constructed. Furthermore, in the case of mixed partly automated
(Continued)

systems, in which parts of the handling tasks are performed by the operator and other parts are performed by gripping robots, the handling is possible in an easy and intuitive way.

13 Claims, 5 Drawing Sheets

(51) Int. Cl.
  *B25B 1/24* (2006.01)
  *B23Q 7/14* (2006.01)
  *B23Q 3/06* (2006.01)
  *B23Q 7/04* (2006.01)
  *B25B 11/02* (2006.01)
  *B25B 1/10* (2006.01)

(52) U.S. Cl.
  CPC ............. *B25B 1/2484* (2013.01); *B23Q 3/06* (2013.01); *B23Q 7/047* (2013.01); *B25B 11/02* (2013.01)

(58) Field of Classification Search
  CPC ......... B25B 1/2484; B25B 5/006; B25H 1/00; B25H 1/02; B25H 1/04; B25H 1/08; H01L 21/687; H01L 21/683
  USPC .................................. 269/318, 309, 311, 314
  See application file for complete search history.

(56) References Cited

U.S. PATENT DOCUMENTS

| | | | | |
|---|---|---|---|---|
| 2008/0184552 A1* | 8/2008 | Lang | ..................... | B65G 21/18 |
| | | | | 29/809 |
| 2011/0226741 A1* | 9/2011 | Bobeck | ................... | B23H 7/26 |
| | | | | 219/69.11 |
| 2011/0280692 A1 | 11/2011 | Evertz et al. | | |

FOREIGN PATENT DOCUMENTS

| | | | | |
|---|---|---|---|---|
| DE | 101 55 077 B4 | 7/2004 | | |
| DE | 2004 021 452 U1 | 4/2008 | | |
| DE | 10 2007 003 673 B3 | 8/2008 | | |
| DE | 10 2007 006 078 A1 | 8/2008 | | |
| DE | 102009052334 A1 * | 7/2010 | ............. | B25B 1/241 |
| DE | 10 2007 005 994 B4 | 8/2010 | | |
| DE | 10 2007 006 078 A1 | 12/2011 | | |
| EP | 0 742 081 A2 | 11/1996 | | |
| EP | 1787750 A1 * | 5/2007 | ............. | B23Q 3/063 |
| EP | 2 062 687 A1 | 5/2009 | | |
| JP | S61-111870 | 5/1986 | | |
| JP | H05-131337 | 5/1993 | | |
| JP | 2009-184104 A | 9/2000 | | |
| JP | 2000237927 A | 9/2000 | | |
| WO | WO-2008098719 A2 * | 8/2008 | ........... | B60B 19/003 |

OTHER PUBLICATIONS

PCT/EP2016/054637 dated May 19, 2016 (3 pages).

\* cited by examiner

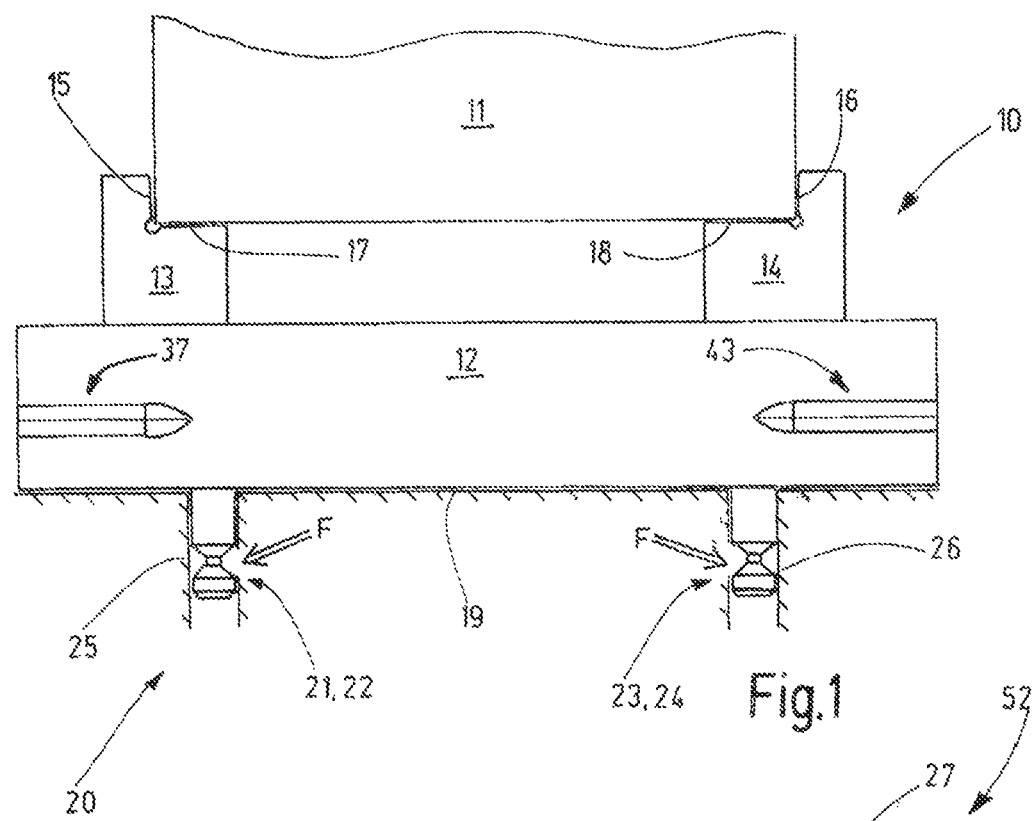
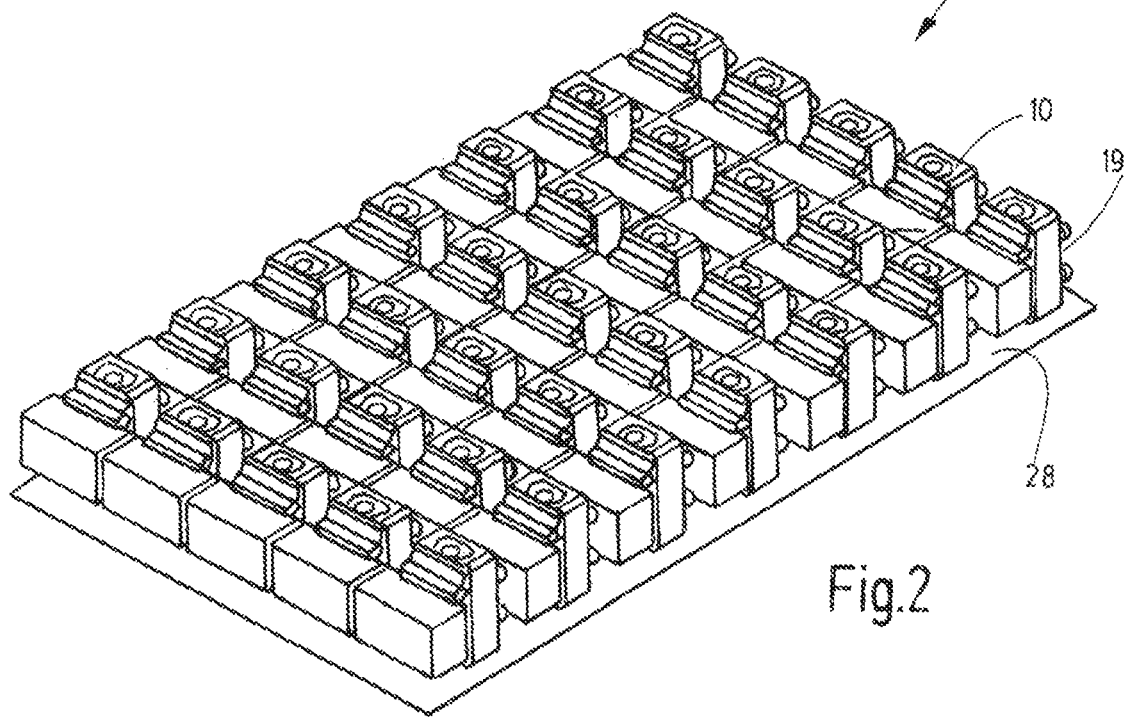

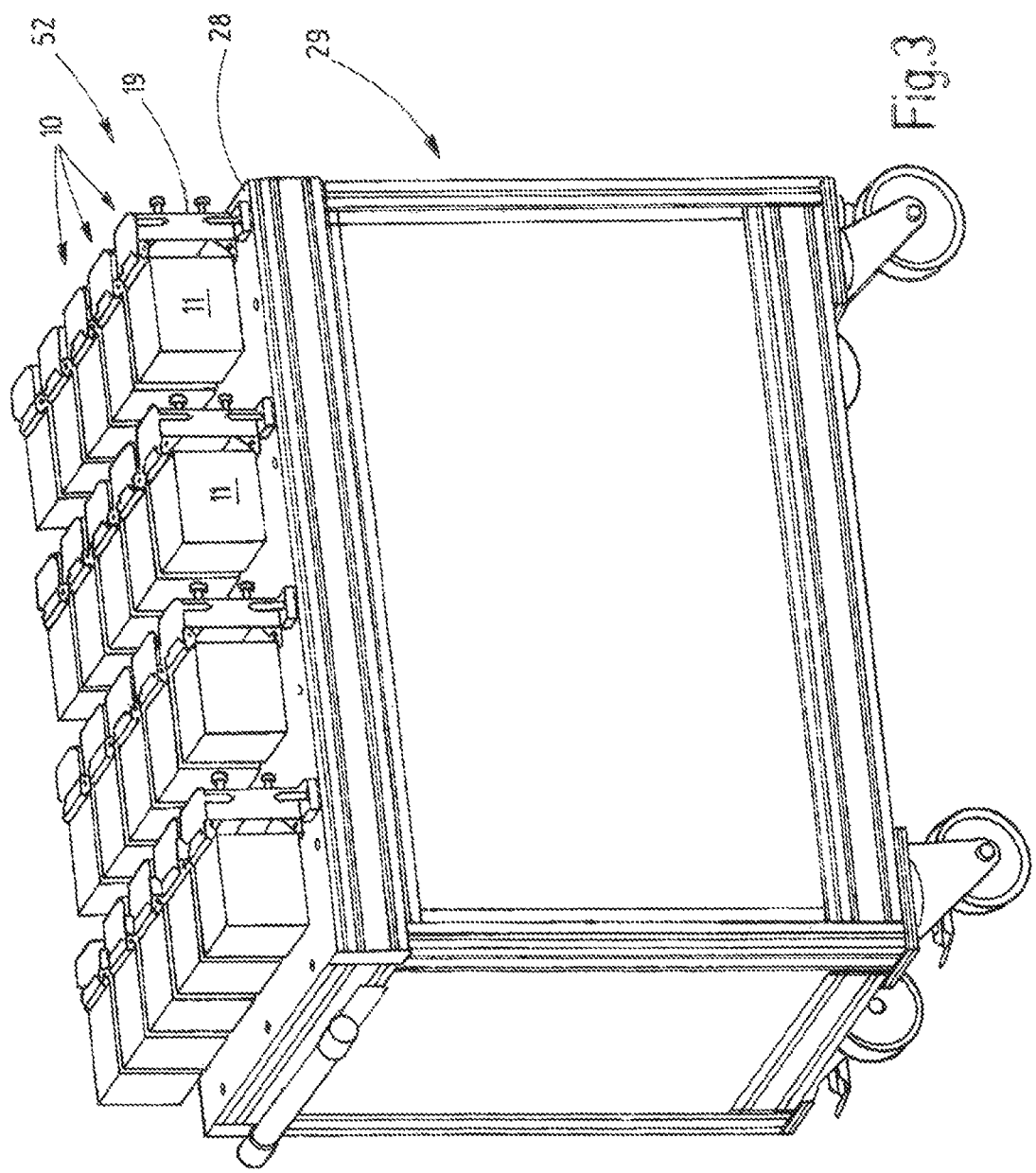

CLAMPING MEANS SYSTEM CAPABLE OF AUTOMATION

CROSS-REFERENCE TO RELATED APPLICATIONS

This is a continuation-in-part application of pending international application PCT/EP2016/054637 filed Mar. 4, 2016, and claiming the priority of German application No. 10 2015 103 653.3 filed Mar. 12, 2015. The said International application PCT/EP2016/054637 and German application No. 10 2015 103 653.3 are both incorporated herein by reference in their entireties as though fully set forth.

BACKGROUND OF THE INVENTION

The invention relates to a clamping vice for workpieces, a clamping means system comprising clamping vices and at least one transport cart, as well as to a method for handling workpieces.

Document DE 101 55 077 B4 discloses a clamping device having repeat accuracy for clamping workpieces in a processing machine. The clamping device comprises a reference plane plate having, arranged on its underside, coupling means in the form of clamping and positioning pins. These extend parallel to each other away from a flat base surface of the clamping plate. The clamping positioning pins are received—in clamped position—by a clamping opening of a reference plane plate, in which case clamping means are arranged in the openings, said clamping means being in contact with the clamping pins.

The clamping device can be manually inserted in and removed from a machine.

Clamping devices of said type can be kept available in a buffer arrangement according to publication DE 10 2007 005 994 B4. For example, with the use of a fork, a handling device can remove individual workpiece carriers from the buffer arrangement and transfer them to a processing machine. In this case, the handling device replaces a worker in charge of loading the machine. However, this requires an extensive mechanization of the entire manufacturing process.

It is the object of the invention to provide a more flexible and, at the same time, highly efficient system for handling workpieces.

SUMMARY OF THE INVENTION

The object mentioned above is achieved with the clamping vice, a clamping means system, as well as with a method according to the claims. The clamping means system of the present invention includes a bearing device and clamping vices, which fit into the bearing device and respectively have on their base area machine coupling system and on their side faces and flanks a bearing receiving contour and a gripping receiving contour. The bearing receiving contour has the greatest play; the fit between the gripper and the gripper receiving contour is of moderate precision, e.g., a few tenths of a millimeter, while the precision of the machine coupling system is the greatest, e.g., a deviation of a few hundredths to a few thousandths of a millimeter. The clear functional separation between the machine coupling system and the bearing receiving contour or gripper receiving contour allows a reliable low-cost system to be constructed. Furthermore, in particular, in the case of mixed partly automated systems, in which parts of the handling tasks are performed by the operator and other parts are performed by gripping robots, the handling is possible in an easy and intuitive way.

The clamping vice according to the invention comprises at least two workpiece jaws for the fixation of a workpiece. To accomplish this, the clamping jaws may have smooth or profiled flat or curved clamping surfaces in order to find a frictionally engaged and/or form-locking abutment on smooth or pre-profiled workpiece surfaces. For moving at least one of clamping jaws or preferably for moving both clamping jaws relative to each other, it is possible to use mechanical means such as, for example, spindles or the like. The clamping jaws are held on a base body of the clamping vice, in which case the base body comprises a continuous base surface that also may be interrupted by openings on which a machine coupling system is arranged.

The machine coupling system is disposed for the accurately positioned acceptance of the clamping vice in a machine tool. In particular, the machine coupling system is configured as in document DE 101 55 077 A1. To accomplish this, preferably three or more clamping and positioning pins may be provided on the base surface of the clamping vice, said pins extending away from the base surface and parallel to each other. In the vicinity of the end of each clamping and positioning pin there may be arranged a preferably trapezoidal groove that interacts with a tightening device provided on a machine. It is disposed to push the positioning and clamping pins away from each other and, in doing so, inject an axial force in order to draw the base surface of the clamping vice against a corresponding clamping surface of the machine tool.

Outside the base surface of the clamping vice, the base body has—in a first location—a bearing receiving contour that may extend, away from one end of the clamping vice, over two flanks thereof that are oriented parallel away from each other. By means of the bearing receiving contour, it is possible for the clamping vice to be received in a defined position on a bearing contour of a bearing device. To do so, the bearing device may comprise appropriate receiving means such as, for example, pins and the like, these forming the bearing contour. The bearing receiving contour of the clamping vice can be inserted in the bearing contour with minimal play.

On the opposite side, the clamping vice has—in a second location—a gripper contour. It may extend from a second face-side end over the flanks of said clamping vice. The second end (and thus the second location) is located opposite the first end (and thus the first location) of the clamping vice and—like it—is formed by one end region of the base body. It ends with one side surface, respectively. Preferably, the two locations are at a distance from each other and are outside the base surface.

The gripper contour may be formed by gripper grooves. Preferably, the gripper contour is spatially separate from the bearing contour. Furthermore, the bearing contour and the gripper contour have preferably different configurations. Consequently, a faulty manual positioning of the clamping vices on the cart—in particular, a confusion of the gripper contour and the bearing contour—can be prevented.

The gripper contour may correspond to the bearing receiving contour or also be configured different therefrom. If each, the gripper contour and the bearing contour, are formed by grooves, they may be configured so as to be discontinuous or also continuous grooves along the flanks. If the clamping vice is seated on the bearing contour and held there by gravitational force, the gripper contour preferably faces upward.

The bearing devices and the bearing receiving contour form a linear guide with play, so that the clamping vice can be removed in a upward-directed linear removal movement from the bearing device and be brought in connection with the bearing device by a linear lowering movement and thus be brought into the bearing position. In each case a pair of conical pins or also a pair of cylindrical pins may act as the bearing device, said pins extending from a support surface parallel to each other, onto which is set the clamping vice with its bearing contour, e.g., grooves.

In its storage position, the clamping vice can be grasped by a mechanical gripper and thus be removed from the bearing device and transferred into a machine. Conversely, a clamping vice provided with a processed workpiece can be removed from the machine (or another source) by means of the gripper and placed on the bearing contour of a bearing device in an accurately positioned manner. Preferably, the gripper contour is disposed for the form-locking coupling to a gripper. To do so, the gripper contour may comprise grooves into which engage gripper fingers, so that a momentum caused by the force of the weight of the clamping vice applied outside of the gripper and of the workpiece is reliably transmitted from the clamping vice to the gripper. In particular, the force vector of the force of the weight emanating from the balance point of the combined arrangement of the clamping vice and the workpiece—when the clamping vice is held with the base surface in horizontal direction—does not extend through the gripper. In other words: the clamping vice is held eccentrically.

The clamping vice according to the invention comprises three different, spatially separate, connections, namely a machine coupling system, a bearing receiving contour and a gripper contour, each being arranged in different locations of the clamping vice—in particular, its base body—and fulfilling specific tasks. The bearing receiving contour (that is also eccentric within the above meaning) is disposed only for supporting the clamping vice and for the transport together with the bearing device. The (eccentric) gripper receiving contour is disposed only for coupling the clamping vice to the gripper and thus for handling. The (central) machine coupling device is disposed only for positioning and fixating the clamping vice in the processing machine. It is not used otherwise, thus avoiding contamination, wear and damage that could lead to misalignments.

This concept and the clamping means system based thereon allow an automated handling of the clamping vice without compromises in view of the clamping and positioning accuracy in the machine tool. In particular, the machine coupling system is used neither for supporting the clamping device nor for transporting it by means of grippers, sliding rails or the like. As a result of this, handling and positioning operations can be accomplished with quite different degrees of accuracy (positioning with micrometer accuracy due to the machine coupling system, positioning with micrometer accuracy due to the bearing receiving contour, positioning with the accuracy of a tenth of a millimeter due to the gripper contour), without damage or misalignments occurring potentially due to the varying degrees of accuracy and robustness during treatment.

For example, the bearing receiving contour may be formed by two grooves that extend parallel to each other along the two flanks of the clamping vice. The two grooves may have a length of several centimeters and are preferably mirror-symmetrical relative to a center plane of the clamping vice. They may have a triangular, trapezoidal or also round cross-section. Preferably, the groove has at least one section having a cross-section that does not change along its longitudinal extent. Furthermore, the groove may have, in particular on its end, a widening or narrowing section.

The same applies regarding the groove cross-section and the groove arrangement for the gripper contour. There, the groove end may have widened or deepened groove regions as the form-locking structure for gripper pliers for accurately positioning the gripper and the clamping vice relative to each other, such accuracy being sufficient to bring the machine coupling system of the clamping vice reliably into engagement with the associate structure of the machine tool.

The clamping means system according to the invention comprises several clamping vices having one of the previously discussed embodiments, as well as at least one clamping vice bearing device, for example in the form of one or more transport carts, on the upper side(s) of which several clamping vice receptacles are arranged, said receptacles forming the bearing contours. Preferably, all bearing contours are oriented in the same way and disposed for receiving clamping vices of the same size. In doing so, they are disposed to receive the clamping vices with the gripper contour directed upward and the bearing receiving contour oriented downward. The distances between the individual clamping vice receptacles (bearing contours) preferably have such dimensions that clamping vices provided with workpieces fit into the clamping vice receptacles, in which case preferably all the workpieces are oriented in the same way. However, the bearing contours may also be oriented differently relative to a vertical axis, so that the workpieces face in different horizontal directions. As a result of this, it is possible, in the case of more complex, e.g., step-shaped, workpieces to minimize the space required by the workpieces.

The bearing contours may be arranged so as to be fixed or repositionable, in any event, preferably in a square or rectangular grid. Regarding its size, the grid may be adapted to the size of the workpieces to be received by the clamping vices. In bearing position, the workpieces extend away from a clamping vice approximately horizontally with respect to the base surface of the previous clamping vice. Furthermore, it is possible to arrange bearing devices for clamping vices of different sizes on one cart. It is also possible for the clamping system to comprise clamping vices having various sizes and, in particular, lengths and the same bearing contours and/or the same gripper contours. The length of a clamping vice is measured in the direction of movement of the clamping jaws. Clamping vices with the same or different workpieces may be arranged on one cart. Independently thereof, the clamping vices may have the same or different lengths.

Such a cart with a clamping vice bearing device can be loaded manually with workpiece-bearing clamping vices and be made available for later processing of a machining order. For processing the machining order, one or more such carts are simply moved into the access area of the gripping robot which then feeds the clamping vices successively to be processed in a processing machine and then deposits the clamping vices with the machined workpiece again on the clamping vice receptacles of the transport cart. To accomplish this, the cart may be moved into a specific parking position so that the gripping robot can blindly grip the clamping vices. However, it is also possible to provide a position-detecting system with which the gripping robot detects the position of the cart and/or the clamping vices in order to grasp and deposit the clamping vices in an appropriately adapted position.

The mode of operation made possible by the clamping means system according to the inventions is flexible and, at the same time, highly automated. Operators have parallel access to all clamping vice receptacles, in which case the gripping robot and the machine tool can process the manufacturing order in series. Moreover, the gripping robot has random parallel access to all clamping vices and thus all workpieces. The gripping robot can feed the workpieces to a processing machine and also successively to several processing machines and can deposit the clamping vices with the processed workpieces on the same cart or another cart in the same or a different position. It is also possible to temporarily deposit the clamping vices in or on the processing machines if bearing devices with bearing contours are provided at locations provided therefore.

The introduced concept of configuring clamping vices can also be implemented on an existing clamping vice inventory. To accomplish this, the bearing receiving contour and the gripper contour—optionally with the provision of appropriate processing data by the clamping vice manufacturer—can be applied by the customer to clamping vices that so far have not been provided with such contours. If the gripper contour and the bearing receiving contour are simple grooves this can be accomplished by milling on the part of the customer.

BRIEF DESCRIPTION OF THE DRAWINGS

Further details of advantageous embodiments of the invention are the subject matter of the claims and of the description and the associate drawings. They show in FIG. 1 a schematic side view of a clamping vice according to the invention;

FIG. 2 a group of clamping vices on a bearing device loaded with workpieces;

FIG. 3 a perspective illustration of a transport cart with a clamping vice bearing device, in a first embodiment;

DETAILED DESCRIPTION OF THE INVENTION

Figure 4:
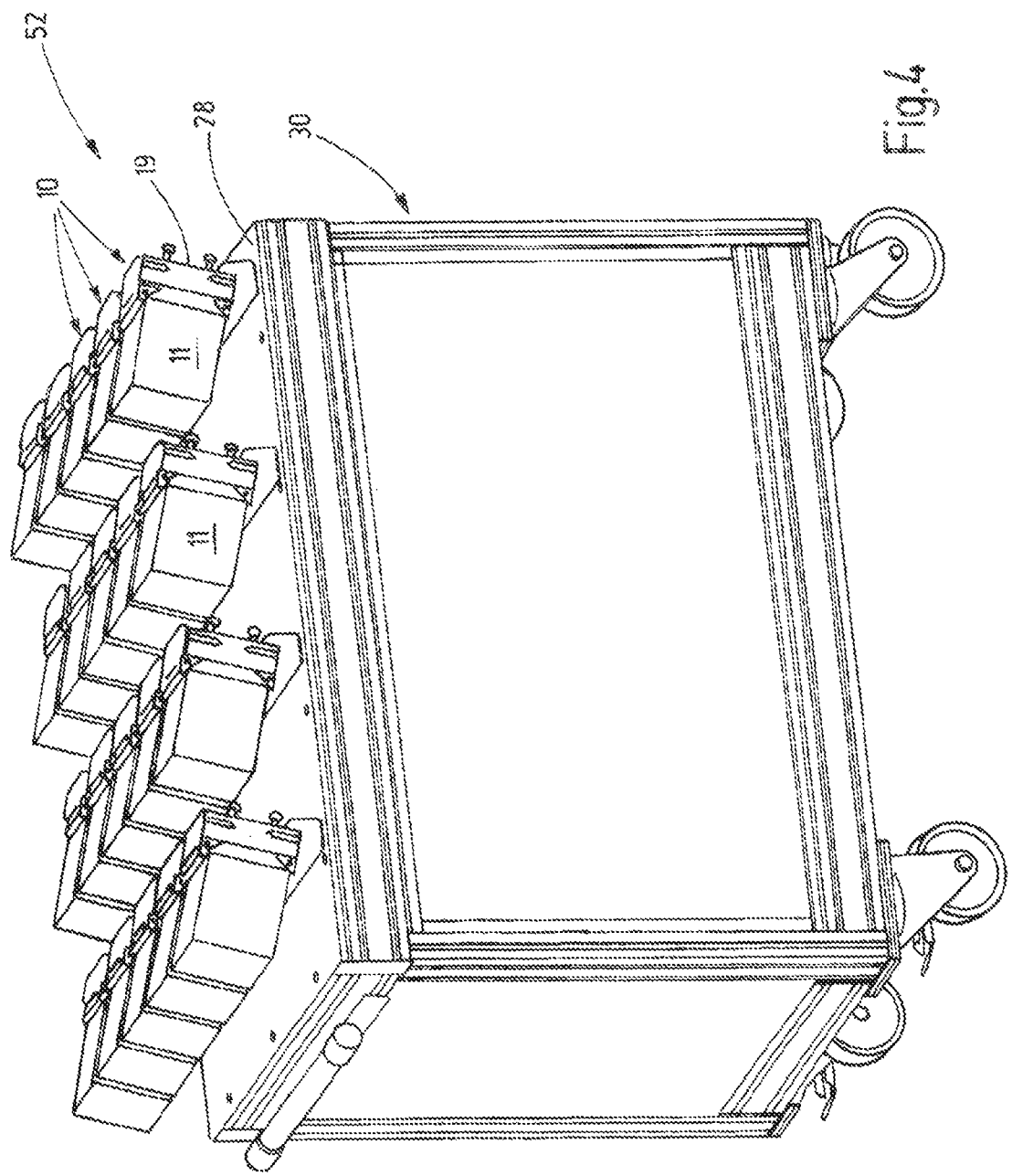
FIG. 4 a transport cart, in a modified embodiment of a clamping vice bearing device.

FIG. 1 is a schematic illustration of a clamping vice 10 that holds a tool 11 available for processing in a not illustrated machine tool. The clamping vice 10 comprises a base body 12 on which are provided at least two clamping jaws 13, 14 that are disposed to hold the workpiece 11 between them. At least one of the clamping jaws 13, 14 is held so as to be movable on the base body 12 toward the other clamping jaw and away therefrom. In a preferred embodiment, the two clamping jaws 13, 14 can be moved toward each other and away from each other. In doing so, a not specifically illustrated helical spindle or another clamping means is disposed for moving and tightening the clamping jaws 13, 14, as well as for releasing them.

For clamping the workpiece 11, the clamping jaws 13, 14 may have appropriate pressure surfaces 15, 16 that are flat and oriented parallel to each other. Furthermore, the clamping jaws 13, 14 may have support surfaces 17, 18 that are located in a common plane for positioning the workpiece 11. The pressure surfaces 15, 16 may also be provided with a profile that fits in a specified profile of the workpiece 11 or generates such a profile.

The clamping vice 10 is provided for the positionally accurate insertion in a machine tool. To accomplish this, the base body 12 has on its base surface 19 a machine coupling system 20 which comprises several, for example four, clamping and positioning pins 21 to 24 (see also FIG. 6). The clamping and positioning pins 21 to 24 have a basic cylindrical form and extend at a right angle away from the base surface 19. They are oriented parallel to each other and are arranged, for example, on the corners of a rectangle or square. Each clamping and positioning pin 21 to 24 has a continuous peripheral trapezoidal groove that is used by a machine-side tightening device in order to apply to the respective clamping and positioning pin 21 to 24 an axial pulling force directed away from the base surface 19 in order to clamp the base surface 19 against a positioning surface of the machine tool. At the same time, such a tightening device is disposed to displace the clamping and positioning pins 21 to 24 radially outward in such a manner that the lower head-like ends of the clamping and positioning pins 21-24 without trapezoidal grooves push—at the corresponding reference surfaces 25, 26—into the receiving bores of the processing machine. The corresponding clamping forces F and the reference surfaces 25, 26 of the processing machine are schematically illustrated in FIG. 1. This machine coupling system 20 has proved to be extremely precise and allows the clamping of clamping vices 10 with repeat accuracy in the range of a hundredths of a millimeter all the way to a thousandths of a millimeter.

Preferably, the clamping vice 10 is part of a clamping means system 27 that comprises a bearing device 28 for an ordered receiving of a larger number of clamping vices 10. These are configured the same among each other and correspond to the description hereinabove. Each clamping vice 10 may be provided with a workpiece 11 that, for example, is held available for processing in a processing machine. The clamping vices 10 are arranged on the bearing device 28, preferably in a rectangular grid, in which case the base surfaces 19 of the individual clamping vices 10 are arranged at an angle—for example, a right angle—relative to a horizontal surface defined by the bearing device 28. Regarding this, FIG. 3 illustrates a transport cart 30 whose bearing device 28 holds the clamping vice 10 with a vertically oriented base surface 19. FIG. 4 shows an alternative cart 30 whose bearing device 28 holds the clamping vices 10 with a base surface 19 oriented in a vertically inclined manner. Whichever embodiment is implemented preferably depends, for example, on the size, shape and weight of the workpieces 11 held in the clamping vices 10.

Figure 5:
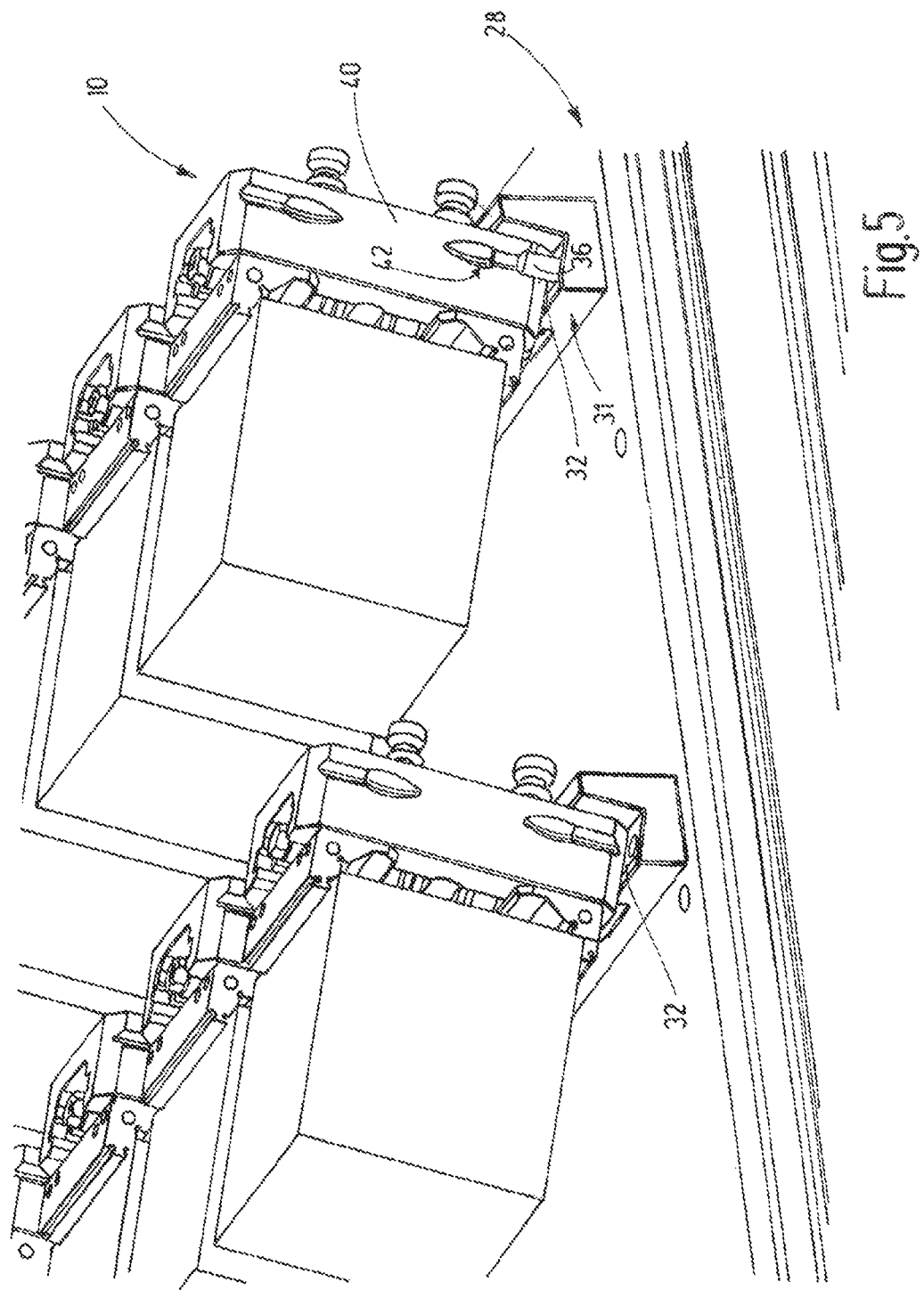
FIG. 5 a perspective illustration of a detail of the clamping vice bearing device according to FIG. 4.
Figure 6:
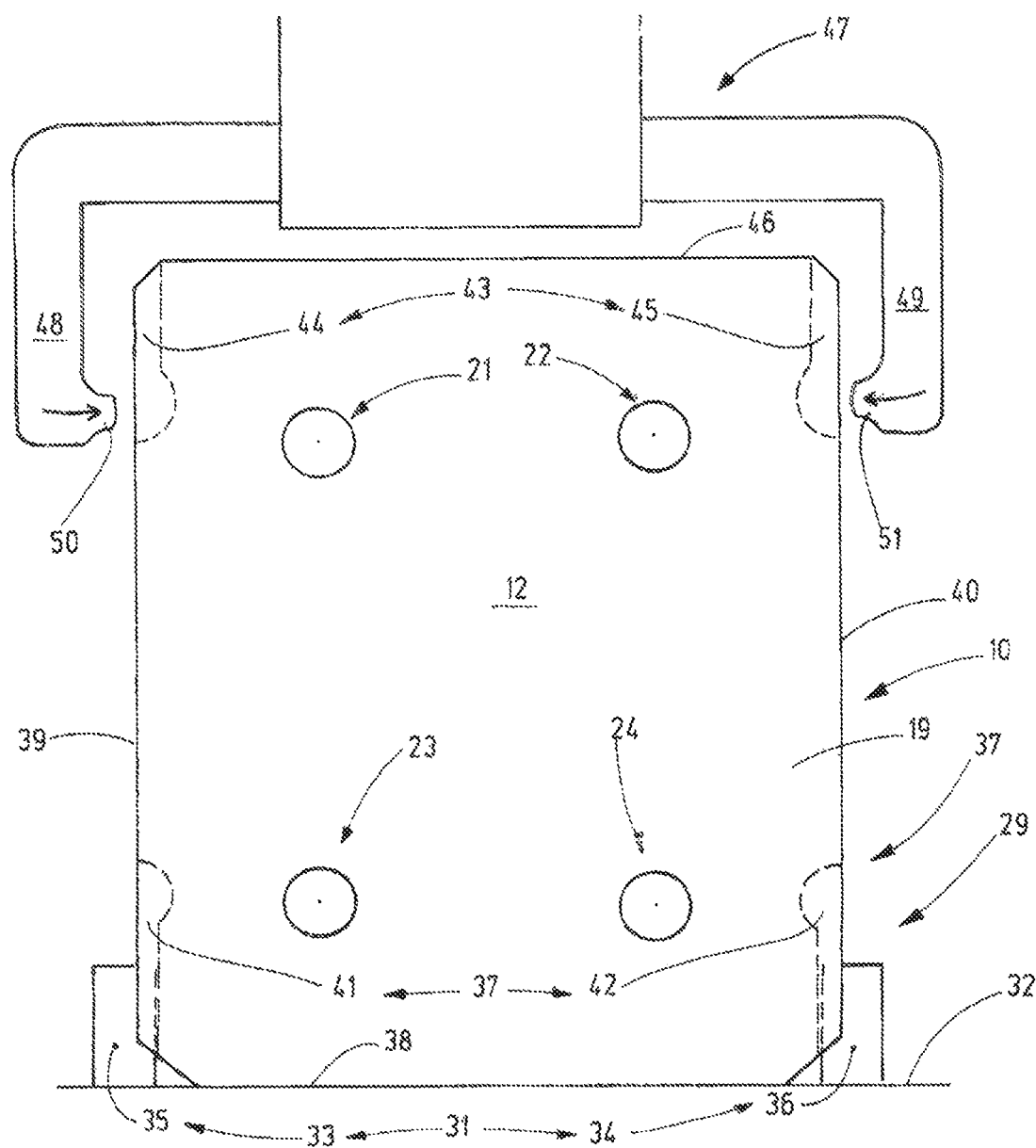
FIG. 6 the clamping vice on the clamping vice bearing device and associate grippers.

FIGS. 5 and 6 give a better illustration of the design of the bearing device 28. The bearing device 28 comprises a bearing contour 31 for the form-locking accommodation of the clamping vice 10. To do so, the bearing contour 31 has, for example, a support surface 32 and suitable bearing elements 33, 34, for example in the form of two cylindrical pins 35, 36 oriented parallel to each other and extending away from the support surface 32, or any otherwise profiled projections. The cylindrical pins 35, 36 extending at a distance from each other upward from the support surface 32 form, together with the support surface 32, the bearing contour 31 with which the clamping vice 10 can be brought into or out of engagement by means of a vertical movement. To accomplish this, the clamping vice 10 has a matching bearing receiving contour 37 that fits on the bearing contour 31 in a form-locking manner.

The bearing receiving contour 37 is formed on the base body 12. Said contour extends, starting from is lower side surface 38 in bearing position, over sections of the two flanks 39, 40 of the base body 12. Thus it is applied to the lower end of the base body 12 in the bearing position. In the present exemplary embodiment, the bearing receiving contour 37 is formed by two grooves 41, 42 that extend parallel to each other and may have a trapezoidal or triangular cross-section, for example. In doing so, the size and arrangement of the grooves 41, 42 are dimensioned in such a manner that the base body 12 can be connected to the bearing contour 31 with minimal play, i.e., that it fits between the cylindrical pins 35, 36. In doing so, the lower side surface 38 rests on the support surface 32. In this position, all the clamping vices 10 are held on the transport cart 29 or 30.

In order to be able to supply the clamping vices 10 with the workpieces 11 thereon, individually or in groups, to a processing machine and to be able to deposit the processed workpieces 11, together with their clamping vices 10 again on a transport cart 29, 30, the clamping vices 10 have on their upper end—in bearing position—a gripper receiving contour 43. This comprises, for example, two gripper grooves 44, 45 that extend away from a second side surface 46 located opposite the first side surface 38 over parts of the two flanks 39, 40 of the base body 12. In doing so, the gripper grooves 44, 45 may be designed like or similar to the grooves 41, 42 belonging to the bearing receiving contour 37. However, it is also possible to use other forms of grooves in order to prevent operators from inadvertently placing the clamping vices having the gripper receiving contour 43 onto the bearing contour 31. Preferably, the bearing contour 31 and the gripper receiving contour 42 are incompatible to this extent.

In the case of the gripper grooves 44, 45 a form-locking association with a gripper 47 comprising gripper pliers with two gripper fingers 48, 49 that fit into the gripper groove 44, 45 or other gripper recesses in a form-locking manner is essential. Preferably, the gripper fingers 48, 49 and the associate complementary structure formed by the gripper grooves 44, 45 or sections thereof are configured so as to be self-centering, so that the gripper 47 is able to grip the clamping vice 10 in a highly accurate manner. For example, in doing so, the fingers 48, 49 reach into the griper grooves 44, 45, in which case nose-like projections 50, 51 formed on the gripper fingers 48, 49 reach into the recesses of the gripper grooves 44, 45. As a result of this, the clamping vice 10 is coupled relative to the vertical position as well as angularly immovable to the gripper 47 and can thus be lifted off the bearing contour 31 and placed on said bearing contour. Furthermore, during transfer from the transport cart 29, 30 to the processing machine it can be pivoted back out of its vertical position into the horizontal position and back again.

The eccentric seat of the clamping pliers 47 on the clamping vice 10 has the result that a line dropped from the balance point (the unit consisting of workpiece and clamping vice) onto the base surface 12 does not extend between the gripper fingers 44, 45. This means, that the clamping vice 10 and the workpiece 11 located thereon generate a considerable momentum due to their weight and the eccentric contact of the clamping pliers 47, which momentum can be reliably transmitted due to the form-locking action between the gripper fingers 48, 49 and gripper groove 44, 45. The same applies to the insertion of the positioning and clamping pins 21-24 into the processing machine and the movement of said machine.

The clamping means system 52 comprising one of the carts 29, 30 and the clamping vices 10 is inserted as follows:

First, the clamping vices 10 are loaded manually or with a suitable device with workpieces 11 and are then arranged on a corresponding bearing device 28 as can be inferred from FIGS. 2 to 4. If the bearing device 28 is arranged on a cart 29 or 30, it is now moved into the access region of a gripping robot, as a result of which the workpieces 11 are made available for processing. The gripper 47 of the gripping robot can now blindly grasp a clamping vice 10—with the cart position being in a fixed or in a non-specific cart position—or grasp the clamping vice 10—by means of suitable control devices, for example, camera-controlled—and pull it upward off the bearing device 28. The grasping of the clamping vice 10 is made particularly easy if the gripper grooves 44, 45 have a triangular or trapezoidal cross-section. Furthermore, a correct vertical position of the gripper 47 relative to the clamping vice 10 is facilitated especially if the gripper 47 is designed so as to be self-centering relative to the gripper receiving contour 43. To do so, the projections 50, 51 may be conical, spherically curved, have the form of a cone or a truncated cone or be configured in another manner so as to be self-centering.

After coupling the gripper 47 to the clamping vice 10, it is removed from the bearing device 28 and supplied to the machine. In doing so, the clamping and positioning pins 21 to 24 are inserted in corresponding receiving openings on the machine and tightened therein. Consequently, the clamping vice 10 is held with the greatest positional accuracy. Now the gripper 47 can be uncoupled and removed from the working area of the machine tool.

Following completed processing, the gripper 47 can again grasp the clamping vice 10 on the gripper receiving contour 43 and, after releasing the machine coupling system 20, move the clamping vice out of the machine tool and deposit it on the bearing device 28. This is accomplished in that the bearing receiving contour 37 is inserted in the bearing contour 31.

In this manner it is possible for the machine tool and for the gripping robot to independently—without operator—process the workpieces made available on the cart 29 or 30.

The clamping means system 52 described so far can be made from known resources and with minimal expense. Only appropriate carts 29, 30 with bearing devices 28 need to be provided. Existing clamping vices can subsequently be provided with the bearing receiving contour 37 and the gripper receiving contour 43, for example in that the appropriate grooves 41, 42 and gripper grooves 44, 45 are milled into the base body 12 based on measurements specified by the manufacturer of the bearing device 28 and the gripper 47, respectively. The specified dimensions of the manufacturer of the clamping vices 10 may also be made available as a data set.

A clamping means system 52 according to the invention comprises a bearing device 28 and clamping vices 10, which fit into this bearing device 28 and respectively have on their base area a machine coupling system 20 and on their side faces 38, 46 and flanks 39, 40 a bearing receiving contour 37 and a gripper receiving contour 43. The bearing receiving contour 37 has the greatest play; the fit between the gripper 47 and the gripper receiving contour 43 is of moderate precision a few tenths of a millimeter, while the precision of the machine coupling system 20 is the greatest a deviation of a few hundredths to a few thousandths of a millimeter. The clear functional separation between the machine coupling system 20 and the bearing receiving contour 43 or gripper receiving contour 37 allows a reliable low-cost system to be constructed. Furthermore, in particular in the case of mixed partly automated systems, in which parts of the handling task are performed by the operator and other parts are performed by gripping robots, the handling is possible in an easy and intuitive way.

LIST OF REFERENCE SIGNS

10 Clamping vice
11 Workpiece
12 Base Body
13 First clamping jaw
14 Second clamping jaw
15 First pressure surface
16 Second pressure surface
17 First support surface
18 Second support surface
19 Base surface
20 Machine coupling system
21-24 Clamping and positioning pins
F Clamping forces
25,26 Reference surfaces
27 Clamping means system
28 Bearing device
29 Transport cart
30 Transport cart
31 Bearing contour
32 Support surface
33 First bearing element
34 Second bearing element
35 First cylindrical pin
36 Second cylindrical pin
37 Bearing receiving contour/clamping vice receptacle
38 First side surface
39 First flank
40 Second flank
41 First groove
42 Second groove
43 Gripper receiving contour
44 First gripper groove
45 Second gripper groove
46 Second side surface
47 Gripper
48,49 Gripper fingers
50,51 Projections
52 Clamping means system

What is claimed is:

1. Clamping means system (27, 52) comprising:
at least two or more workpieces (11),
at least two or more clamping vices (10),
at least two or more workpiece-clamping vice units, each workpiece-clamping vice unit including one of the workpieces (11) firmly clamped to one of the clamping vices (10),
a cart (29, 30) including wheels, the cart (29, 30) configured for storing and for the rolling transport of the at least two or more workpiece-clamping vice units, the cart (29, 30) having an upper side having a bearing device (28) operatively arranged thereon carrying a plurality of bearing contours (31) each of the bearing contours (31) configured for the form locking accommodation of one of the at least two or more clamping vices (10) of a respective workpiece-clamping vice unit, each clamping vice (10) is arranged tilted on the cart (29, 30) so that its respective workpiece (11) protrudes sidewards from the respective clamping vice (10),
the at least two or more clamping vices (10) each include:
a base body (12) having a base surface (19) on which is arranged a machine coupling system (20) including a plurality of clamping and positioning pins extending from the base surface (19);
at least two workpiece clamping jaws (13, 14) operatively arranged on a clamping jaw receiving surface of the base body (12) opposite the base surface (19), at least one of the workpiece clamping jaws (13, 14) is supported so as to be movable toward and away from another of the at least two workpiece clamping jaws (13, 14);
a downward-oriented bearing receiving contour (37) for coupling to one of the bearing contours (31) in a storage position of the clamping vice (10) when stored on the cart (29, 30), the downward-oriented bearing receiving contour (37) located outside the base surface (19) and originating on a lower side surface (38) of the base body (12) in the storage position;
an upward-directed gripper receiving contour (43) configured for coupling the clamping vice (10) in a form-locking manner to a gripper, the upward-directed gripper receiving contour (43) in the storage position of the clamping vice (10) originating on an upper side surface (46) of the base body (12) in the storage position, the lower side surface (38) and the upper side surface (46) of the base body (12) facing away from each other and separated on an opposite respective edge thereof by the base surface (19) which is thereby delimited,
the plurality of bearing contours (31) operatively arranged at a uniform height and oriented in the same way on the bearing device (28), each of said bearing contours (31) is directed upward and configured to receive and store one of the workpiece-clamping vice units by operatively engaging the respective one of the downward-oriented bearing receiving contours (37) of a respective clamping vice (10) of the one workpiece-clamping vice unit.

2. Clamping means system (27, 52) according to claim 1, characterized in that the downward-oriented bearing receiving contour (37) comprises two grooves (41, 42) each extending upwardly from the lower side surface (38) of the base body (12) in the storage position parallel to each other along two flanks (39, 40) of the base body (12), said flanks facing away from each other.

3. Clamping means system (27, 52) according to claim 2, characterized in that the grooves (41, 42) have a trapezoidal or a triangular cross-section.

4. Clamping means system (27, 52) according to claim 2, characterized in that the grooves (41, 42) have a changing cross-section along their length.

5. Clamping means system (27, 52) according to claim 1, characterized in that the upward-directed gripper receiving contour (43) comprises two gripper grooves (44, 45) each extending downwardly from the upper side surface (46) of the base body (12) in the storage position parallel to each other along two flanks (39, 40) of the clamping vice (10), said flanks facing away from each other.

6. Clamping means system (27, 52) according to claim 5, characterized in that the gripper grooves (44, 45) of the upward-directed gripper receiving contour (43) have a trapezoidal or a triangular cross-section.

7. Clamping means system (27, 52) according to claim 5, characterized in that the grooves (44, 45) of the upward-directed gripper receiving contour (43) have a changing cross-section along their length.

8. Clamping means system (27, 52) according to claim 2, characterized in that the flanks (39, 40) are straight surfaces in groove direction.

9. Clamping means system (27, 52) according to claim 1, characterized in that both workpiece clamping jaws (13, 14) can be moved by a clamping mechanism in opposite direction relative to each other.

10. Clamping means system (27, 52) according to claim 1, characterized in that the plurality of bearing contours (31) are arranged in a grid on the bearing device (28).

11. Method for handling workpieces by means of a clamping means system (27, 52) according to claim 1,
said method comprising the following steps:
wherein the bearing contours (31) of the cart (29, 30) are loaded with workpiece-clamping vice units including clamping vices (10) that are configured the same with respect to each other, in which the clamping vices workpieces (11) are being held, the bearing contours (31) and the bearing receiving contours (37) are brought into engagement due to a vertical movement; and
wherein the cart (29, 30) is placed in an access region of a gripping robot, the bearing contours (31) and the bearing receiving contours (37) are brought out of engagement due to a vertical movement, the gripping robot grasps the clamping vices (10)—with the workpieces (11) held therein for processing—at the gripper receiving contour (43) and transfers them for processing of the workpiece (11) into a processing machine, and—after completed processing—deposits them again on a bearing contour (31) of the cart, wherein the bearing contours (31) and the bearing receiving contours (37) are brought into engagement due to a vertical movement.

12. Method according to claim 11, wherein each of the workpiece-clamping vice units is pivoted on its path from the bearing device (28) to a machine tool by a right angle or by an acute angle about a horizontal axis in order to transfer the base surface (19) of the respective clamping vice (10) that is laterally oriented in a bearing position into a downward-oriented horizontal processing position, and vice versa.

13. Method according to claim 12, wherein the gripping robot grasps the respective clamping vice (10) at the gripper receiving contour (43) laterally relative to an axis extending through a balance point of the clamping vice, perpendicular to its base surface (19).

* * * * *